United States Patent
Deng et al.

(10) Patent No.: US 11,526,424 B2
(45) Date of Patent: Dec. 13, 2022

(54) AUTOMATED PROGRAM REPAIR TOOL

(71) Applicant: MICROSOFT TECHNOLOGY LICENSING, LLC., Redmond, WA (US)

(72) Inventors: Shao Kun Deng, Seattle, WA (US); Neelakantan Sundaresan, Bellevue, WA (US); Alexey Svyatkovskiy, Bellevue, WA (US); Michele Tufano, Bellevue, WA (US)

(73) Assignee: MICROSOFT TECHNOLOGY LICENSING LLC., Redmond, WA (US)

( * ) Notice: Subject to any disclaimer, the term of this patent is extended or adjusted under 35 U.S.C. 154(b) by 79 days.

(21) Appl. No.: 16/897,824

(22) Filed: Jun. 10, 2020

(65) Prior Publication Data

US 2021/0357307 A1   Nov. 18, 2021

Related U.S. Application Data

(60) Provisional application No. 63/025,535, filed on May 15, 2020.

(51) Int. Cl.
*G06F 11/36* (2006.01)
*G06N 20/00* (2019.01)

(52) U.S. Cl.
CPC ........... *G06F 11/362* (2013.01); *G06N 20/00* (2019.01)

(58) Field of Classification Search
CPC .............................. F06F 11/362; G06N 20/00
See application file for complete search history.

(56) References Cited

U.S. PATENT DOCUMENTS

| | | | |
|---|---|---|---|
| 11,099,928 B1 * | 8/2021 | Vah | G06F 11/0793 |
| 2005/0015752 A1 * | 1/2005 | Alpern | G06F 11/3604 717/131 |
| 2020/0097389 A1 * | 3/2020 | Smith | G06F 11/0775 |
| 2021/0248450 A1 * | 8/2021 | Tay | C12N 15/00 |
| 2021/0311853 A1 * | 10/2021 | Shao | G06F 11/3604 |
| 2021/0326719 A1 * | 10/2021 | Mahmud | G06N 20/00 |

OTHER PUBLICATIONS

Karan Samel et al., "Active Deep Learning to Tune Down the Noise in Labels", [Online], pp. 685-694, [Retrieved from Internet on Oct. 20, 2021], <https://dl.acm.org/doi/pdf/10.1145/3219819.3219914>, (Year: 2018).*

(Continued)

*Primary Examiner* — Ziaul A Chowdhury

(57) ABSTRACT

An automated program repair tool utilizes a neural transformer model with attention to predict the contents of a bug repair in the context of source code having a bug of an identified bug type. The neural transformer model is trained on a large unsupervised corpus of source code using a span-masking denoising optimization objective, and fine-tuned on a large supervised dataset of triplets containing a bug-type annotation, software bug, and repair. The bug-type annotation is derived from an interprocedural static code analyzer. A bug type edit centroid is computed for each bug type and used in the inference decoding phase to generate the bug repair.

20 Claims, 14 Drawing Sheets

(56) References Cited

OTHER PUBLICATIONS

Michael Pradel et al., "Fully Automatic and Precise Detection of Thread Safety Violations", [Online], pp. 521-530, [Retrieved from Interent on May 4, 2022], <https://dl.acm.org/doi/pdf/10.1145/2254064.2254126>, (Year: 2012).*

Mohamed I. Khaber et al., "Deep Neural Transformer Model for Mono and Multi Lingual Machine Translation", [Online], pp. 1-10, [Retrieved from Internet on Aug. 7, 2022], <http://ceur-ws.org/Vol-2904/66.pdf>, (Year: 2020).*

Ankit Choudhary et al., "Efficient Detection of Thread Safety Violations via Coverage-Guided Generation of Concurrent Tests", [Online], pp. 266-277, [Retrieved from Internet on Aug. 7, 2022], <https://ieeexplore.ieee.org/stamp/stamp.jsp?tp=&arnumber=7985668> (Year: 2017).*

"A Tool to Detect Bugs in Java and C/C++/Objective-C Code Before it Ships", Retrieved From: https://fbinfer.com/, Retrieved Date: Jun. 25, 2020, 5 Pages.

Calcagno, et, al., "Moving Fast with Software Verification", In NASA Formal Methods Symposium, Apr. 27, 2015, 9 Pages.

Chen et, al., "Sequencer: Sequence-to-Square Learning for End-to-End Program Repair", In Journal of IEEE Transactions on Software Engineering, Sep. 9, 2019, 17 Pages.

Raffel et, al., "Exploring the Limits of Transfer Learning with A Unified Text-to-Text Transformer", In Repository of arXiv:1910.10683, Oct. 23, 2019, 52 Pages.

Tufano et, al., "An Empirical Study on Learning Bug-Fixing Patches in the Wild via Neural Machine Translation.", In Proceedings of ACM Transactions on Software Engineering and Methodology, Sep. 2, 2019, pp. 1-29.

Vaswani et, al., "Attention Is All You Need", In Repository of arXiv:1706.03762v5 [cs.CL], Dec. 6, 2017, 15 Pages.

Wang et, al., "Neural Machine Translation with Byte-Level Subwords", In Repository of arXiv:1909.03341, Dec. 5, 2019, 7 Pages.

Yin et, al., "Learning to Represent Edits", In Proceedings of International Conference on Learning Representations. Feb. 22, 2019, 22 Pages.

Devlin, et al., "Semantic Code Repair using Neuro-Symbolic Transformation Networks", In Repository of arXiv:1710.110541, Oct. 30, 2017, pp. 1-11.

Hata, et al., "Learning to Generate Corrective Patches using Neural Machine Translation", In Repository of arXiv:1812.07170v1, Dec. 18, 2018, pp. 1-17.

Lutellier, et al., "ENCORE: Ensemble Learning using Convolution Neural Machine Translation for Automatic Program Repair", In Repository of arXiv:1906.08691v1, Jun. 20, 2019, pp. 1-18.

Mesbah, et al., "DeepDelta: Learning to Repair Compilation Errors", In Proceedings of the 27th ACM Joint Meeting on European Software Engineering Conference and Symposium on the Foundations of Software Engineering, Aug. 26, 2019, pp. 925-936.

"International Search Report and Written Opinion Issued in PCT Application No. PCT/US21/026738", dated Jul. 6, 2021, 12 Pages.

* cited by examiner

AUTOMATED PROGRAM REPAIR TOOL

CROSS-REFERENCE TO RELATED APPLICATIONS

The present application claims the benefit of the earlier filed provisional application having Ser. No. 63/025,535 filed on May 15, 2020, the entirety of which is hereby incorporated by reference.

BACKGROUND

During the development of a program or software, a range of measures is taken to ensure that the program is tested prior to the release and distribution of the program. These measures are aimed at reducing the number of bugs in the program in order to improve the quality of the program. A bug in a source code program is an unintended state in the executing program that results in undesired behavior. There are different types of software bugs which may not be detected before the program is released.

Static analysis tools are often used to detect certain types of bugs, such as syntax errors. However, static analysis tools are not adept at analyzing runtime behavior and cannot detect runtime errors. Testing is used to identify software bugs that occur at runtime. It is impossible to test all possible user scenarios and at times, the testing is limited to certain user scenarios. In addition, tests are ineffective at discovering certain unknown bugs or defects deterministically, such as resource leaks, memory leaks, null pointer dereferences, and concurrency errors, which are difficult to detect deterministically.

Software maintenance makes the corrective measures needed to fix software bugs after the bugs are reported by end users. Fixing the software bugs after deployment of the program hampers the usability of the deployed program and increases the cost of the software maintenance services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An automated program repair tool is based on a sequence-to-sequence neural transformer model with attention to predict a bug repair in the context of a code snippet containing the source code bug and its identified bug type. The neural transformer model detects similar properties among certain types of source code bugs across different contexts and domains and learns specific bug-fix patterns for common bug types. Bugs belonging to the same category can be fixed using similar patterns of code changes.

The neural transformer model is pre-trained on a large unsupervised corpus of source code using a span-masking denoising optimization objective, and fine-tuned on a large supervised dataset of triplets containing a bug-type annotation, software bug, and repair. The bug-type annotation is derived from an interprocedural static code analyzer which relies on mathematical logic and symbolic reasoning to detect common bug types.

For each bug within a bug type category, an edit embedding representation is generated which aims to encapsulate essential information of the bug type and the code changes needed to fix it. Subsequently, a single bug-type edit centroid is computed for each bug type category, from the edit embeddings of each bug of the same type. The bug-type edit centroid is then used during inference in the decoding phase to generate the bug repair for bugs belonging to the same category. Specifically, the bug type annotation and edit representation are used during fine-tuning, while the bug-type centroid is used during inference in place of the edit representation, when the bug repair is not available.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The subject matter disclosed pertains to automated program repair based on a sequence-to-sequence neural transformer model with attention. Automated program repair is the task of predicting the contents of a software bug fix in the context of a code snippet containing a software bug and its identified bug type.

Certain types of software bugs have similar properties across different contexts and domains and can be fixed using similar patterns of code changes. The neural transformer model learns specific bug-fix patterns for common bug types. Bugs belonging to the same category can be fixed using similar patterns of code changes.

In one aspect, the neural transformer model focuses on memory safety software bugs such as null dereference, immutable cast, empty vector access, memory leaks, and thread-safety violations. Null pointer dereference occurs when the program dereferences a pointer that it expects to be valid, but is null, or points to memory that has not been allocated. Null pointer dereferences typically cause the program to crash or exit. An immutable cast is an unsafe cast operation where it is not possible to cast a variable of one data type into another data type. For example, it is not possible to cast a null string into a non-null string.

An empty vector access error occurs when a program attempts to access a vector that has not been allocated. A race condition is a thread safety error that occurs when two threads attempt to access a shared memory address at the same time. A memory leak occurs when a program allocates memory without eventually releasing it. Eventually, the program will exhaust all the available memory and crash when the program attempts to allocate additional memory.

The neural transformer model is trained on a large unsupervised corpus of source code using a span-masking denoising optimization objective, and fine-tuned on a large supervised dataset of triplets containing a bug-type annotation, software bug, and its repaired version. The bug-type annotation is derived from an interprocedural static code analyzer which relies on mathematical logic and symbolic reasoning to detect common bug types.

For each bug within a bug-type category, an edit embedding representation is generated which aims to encapsulate essential information of the bug type and the code changes needed to fix it. Subsequently, a single bug-type edit centroid is computed for each bug-type category, from the edit embeddings of each bug of the same type. The bug-type edit centroid is then used in the decoding phase to generate the bug repair for bugs belonging to the same category. Specifically, the bug type annotation and edit representation are used during fine-tuning, while the bug-type centroid is used during inference in place of the edit representation, when the bug repair is not available.

Figure 1:
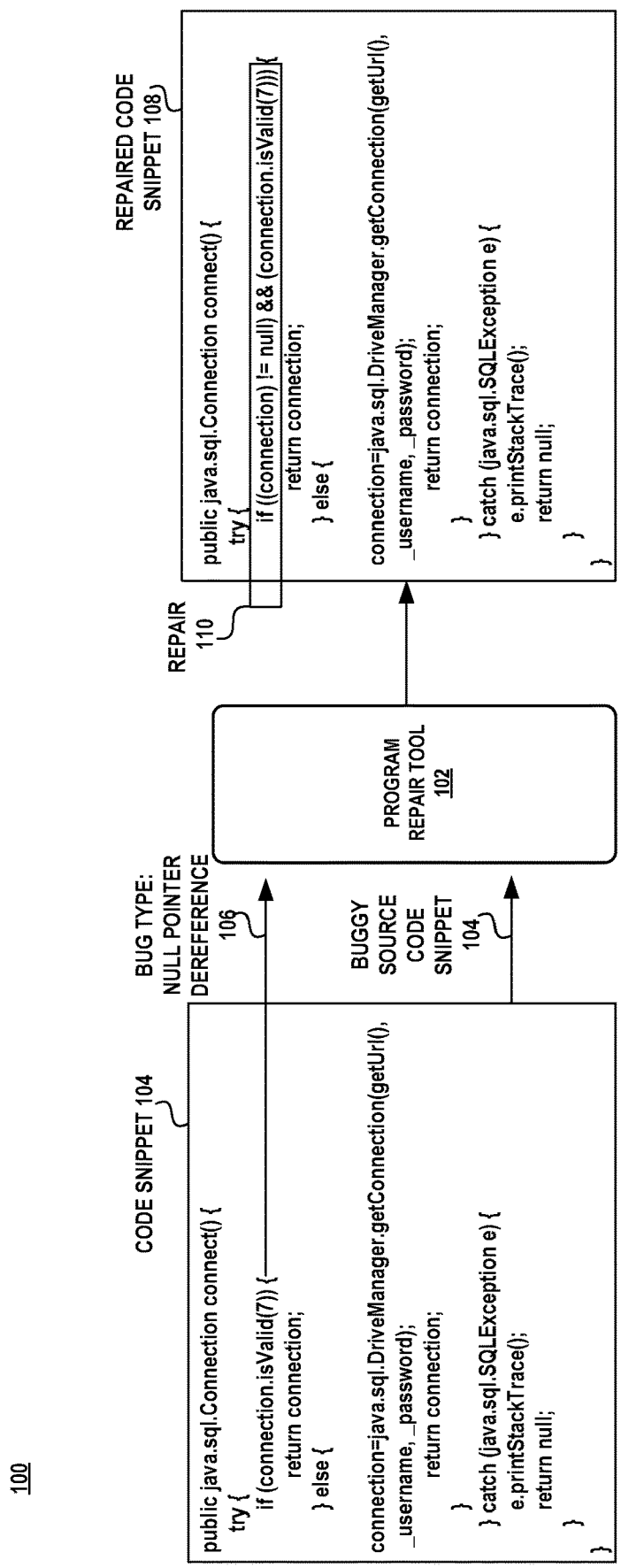
FIG. 1 illustrates an exemplary automated program repair tool that predicts a code repair for a buggy source code snippet having an identified bug type.

FIG. 1 shows an exemplary automated program repair system 100 in which a program repair tool 102 receives a code snippet 104 having been identified as having a source code bug 104 and the corresponding bug type 106. The code snippet 104 in FIG. 1 is written in the Java programming language and has a line of code with an identified null pointer deference, if (connection.isValid(7)). A null pointer dereference occurs when a program dereferences a pointer or value that it expects to be valid but is null. In order to avoid this problem, the program should check if the connection object is not null before invoking the isValid method.

As shown in FIG. 1, the program repair tool 102 provides a proposed repair 110 for the erroneous line of code in a repaired code snippet 108. The repair includes a check to ensure that the connection object is not null, if ((connection) !=null) && (connection.isValid(7))), before attempting to invoke the isValid( ) method.

The program repair tool 102 is based on a neural transformer model with attention trained on various source code programs. The neural transformer model handles dependencies between its input and output with attention and without using recurrent neural networks (RNN) (e.g., long short-term memory (LSTM) network) and convolutional neural networks (CNN). Attention is a mechanism that identifies which parts of an input sequence are relevant to each symbol in the output sequence and allows the neural transformer to access the entire input sequence all at once.

Attention now turns to a description of the architecture of the neural transformer model with attention.

Neural Transformer Model Architecture

Figure 2:
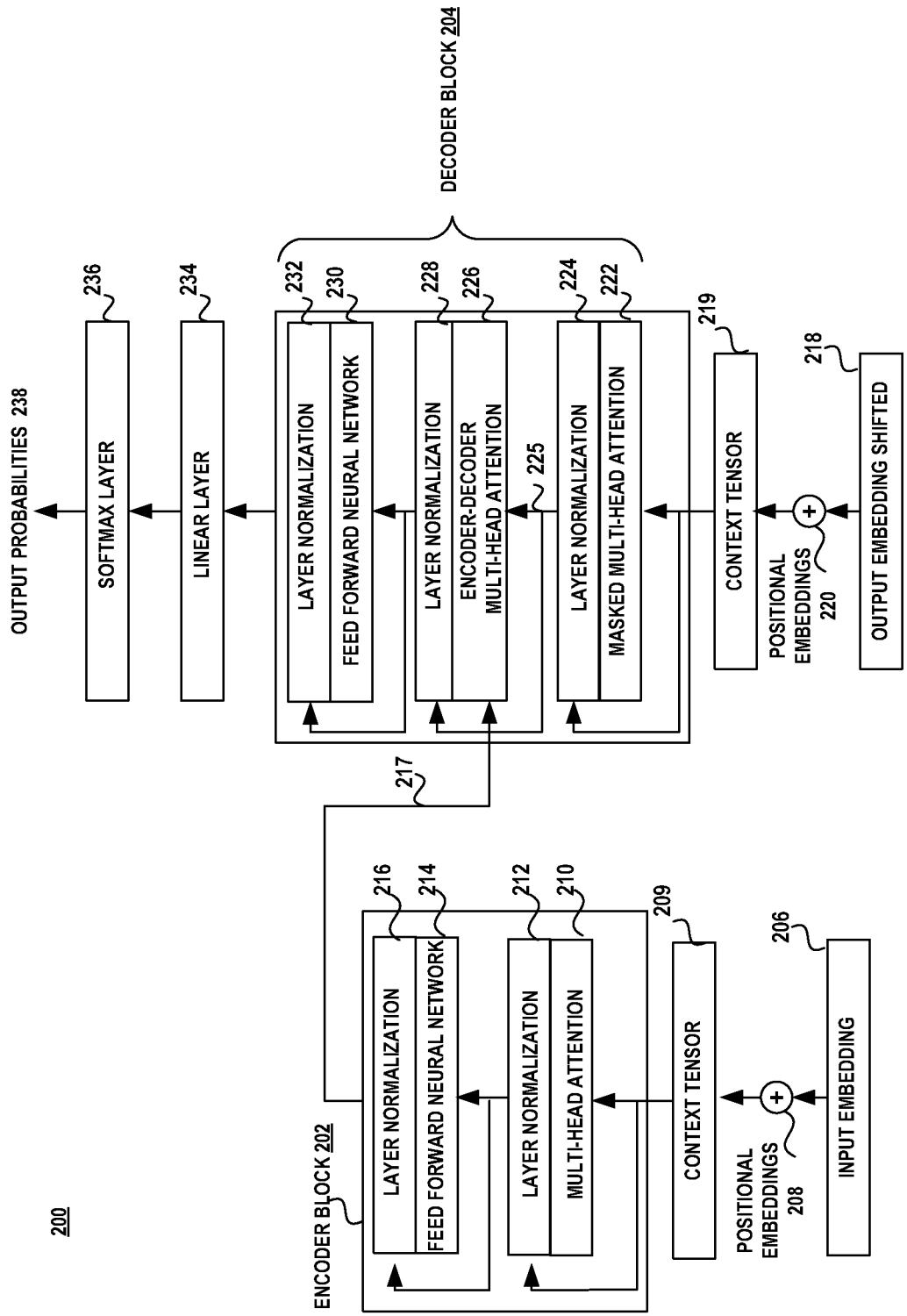
FIG. 2 is a schematic diagram illustrating an exemplary architecture of a neural transformer model based on encoder and decoder blocks with attention.

FIG. 2 shows an exemplary structure of the neural transformer model in an encoder-decoder configuration. The neural transformer model 200 contains one or more encoder blocks 202 and one or more decoder blocks 204. The initial inputs to an encoder block 202 are the input embeddings 206 of an input sequence of the training dataset. In order to retain the order of the tokens in the input sequence, positional embeddings 208 are added to the input embedding 206 forming a context tensor 209. The initial inputs to the decoder block 204 are a shifted sequence of the output embeddings 218 from the previous time step to which the positional embeddings 220 are added forming context tensor 219.

An encoder block 202 consists of two layers. The first layer includes a multi-head attention component 210 followed by layer normalization component 212. The second layer includes a feed-forward neural network 214 followed by a layer normalization component 216. The context tensor 209 is input into the multi-head attention layer 210 of the encoder block 202 with a residual connection to layer normalization 212. The output of the layer normalization 212 is input to the feed forward neural network 214 with another residual connection to layer normalization 216. The output of the encoder block 202 is a set of hidden representations 217. The set of hidden representations 217 is then sent through additional encoder blocks, if multiple encoder blocks exist, or to the decoder 204.

Attention is used to decide which parts of the input sequence are important for each subtoken, especially when decoding long sequences since the encoder is limited to encoding a fixed-size vector. Attention mechanisms gather information about the relevant context of a given subtoken and then encode that context into a vector which represents the subtoken. It is used to identity the relationships between subtokens in the long sequence while ignoring other subtokens that do not have much bearing on a given prediction.

The multi-head attention component 210 takes a context tensor 209 and weighs the relevance of each subtoken represented in the context tensor to each other by generating attention weights for each subtoken in the input embedding 206. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one subtoken in a sequence, K is the vector representations of all subtokens in the sequence, and V is the vector representations of all the subtokens in the sequence.

The queries, keys and values are linearly projected h times in parallel with $d_v$ output values which are concatenated to a final value:

$$\text{MultiHead}(Q,K,V)=\text{Concat}(\text{head}_1, \ldots, \text{head}_h)W^O,$$

where $\text{head}_i=\text{Attention}(QW_i^Q,KW_i^K,VW_i^V)$, with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

In order to reduce the training time of the neural transformer, layer normalization is used between the layers. The layer normalization component normalizes the inputs across the features. The mean and standard deviation is computed across the feature dimensions. There is a first layer normalization 212 that precedes the feed forward neural network 214 and a second layer normalization 216 that follows the feed forward neural network 214.

The feed-forward neural network 214 processes each output encoding separately 213. The output of the top encoder block is a set of attention vectors K and V 217 which is used by the encoder-decoder multi-head attention layer 226 of the decoder block 204.

The decoder block 204 predicts each subtoken $t_i$ in the target language one-by-one at each time step conditioned on all previously-generated target subtokens $t_1, \ldots t_{i-1}$. The decoder block 204 consists of three layers. The first layer includes a masked multi-head attention component 222 followed by a layer normalization component 224. The output of the layer normalization component 224 is input into the encoder-decoder multi-head attention component 226 with a residual connection to layer normalization component 228. The second layer includes an encoder-decoder multi-head attention component 226 followed by a layer normalization component 228. The output of layer normalization component 228 is input into the feed forward neural network 230 with a residual connection to layer normalization component 232. The third layer includes a feed forward neural network 230 followed by a layer normalization component 232.

The masked multi-head attention component 222 receives the output embeddings of the previous timestep. The masked multi-head attention component 222 masks the output embeddings from future time steps. The encoder-decoder multi-head attention layer 226 receives queries from the previous decoder layer 225 and the memory keys and values 217 from the output of the encoder block 202. In this manner, the decoder block 204 can attend to every position of the input sequence. The feed-forward neural network 230 processes each output encoding separately. A layer normalization component 224, 228, 232 is used between the layers in order to normalizes the inputs across the features.

The linear layer 234 projects the vector produced by the stack of decoders into a logits vector. The softmax layer 236 then turns the scores of the logits vector into probabilities for each subtoken in the vocabulary which are positive and normalized 238.

In one aspect, the neural transformer model contains a stack of six encoder blocks and a stack of six decoder blocks which are aggregated into a neural transformer block. The output of each encoder block is passed onto the next encoder block and processed. Each decoder block receives the attention weights computed from the last encoder block. The use of multiple stacked encoder blocks and decoder blocks increases the model's capacity allowing the model to learn increasing levels of abstraction.

Neural Transformer-Based Program Repair Generation

Figure 3:
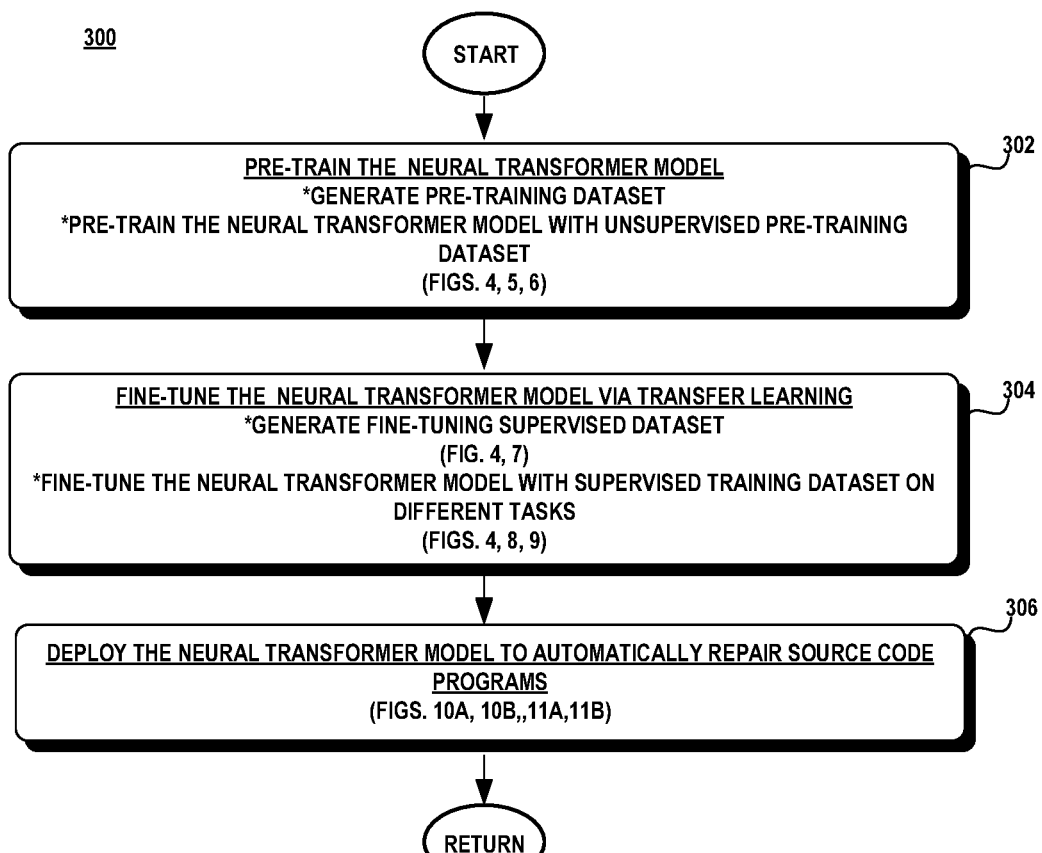
FIG. 3 is a flow diagram illustrating an exemplary method for training the neural transformer model and deploying the neural transformer model to automatically repair buggy source code programs.

FIG. 3 is a flow diagram illustrating an exemplary process of a neural transformer model-based automated program repair tool 300. Initially, the neural transformer model is trained through a transfer learning process that includes pre-training the neural transformer model with an unsupervised training dataset of source code (block 302) and fine-tuning the neural transformer model with a supervised training dataset of translation tasks (block 304).

The unsupervised training dataset includes source code snippets for the neural transformer model to learn statistical properties of the source code, such as syntactic rules of the programming languages, as well as semantic information from co-occurrence of specific variable and method names. The pre-trained model represents a base which is subsequently fine-tuned on bug repair translation tasks. The supervised training data includes triplets consisting of a buggy source code snippet, its repair code snippet, and its bug type which train the neural transformer model to learn to translate buggy code of a particular bug type into a specific bug repair. When the model has been trained and verified successfully, the model is deployed in an automatic program repair tool (block 306).

Transfer Learning

The neural transformer model is trained through transfer learning. Transfer learning is a methodology of training models by pre-training the model using unsupervised learning on unlabeled data to learn generalized knowledge and then fine-tuning the model via supervised learning on labeled data. The neural transformer model is pre-trained on a large unsupervised training dataset of unlabeled source code that contains lines of source code in various programming languages (e.g., Python, C#, JavaScript and TypeScript) using a denoising objective and then separately fine-tuned on translation tasks.

Figure 4:
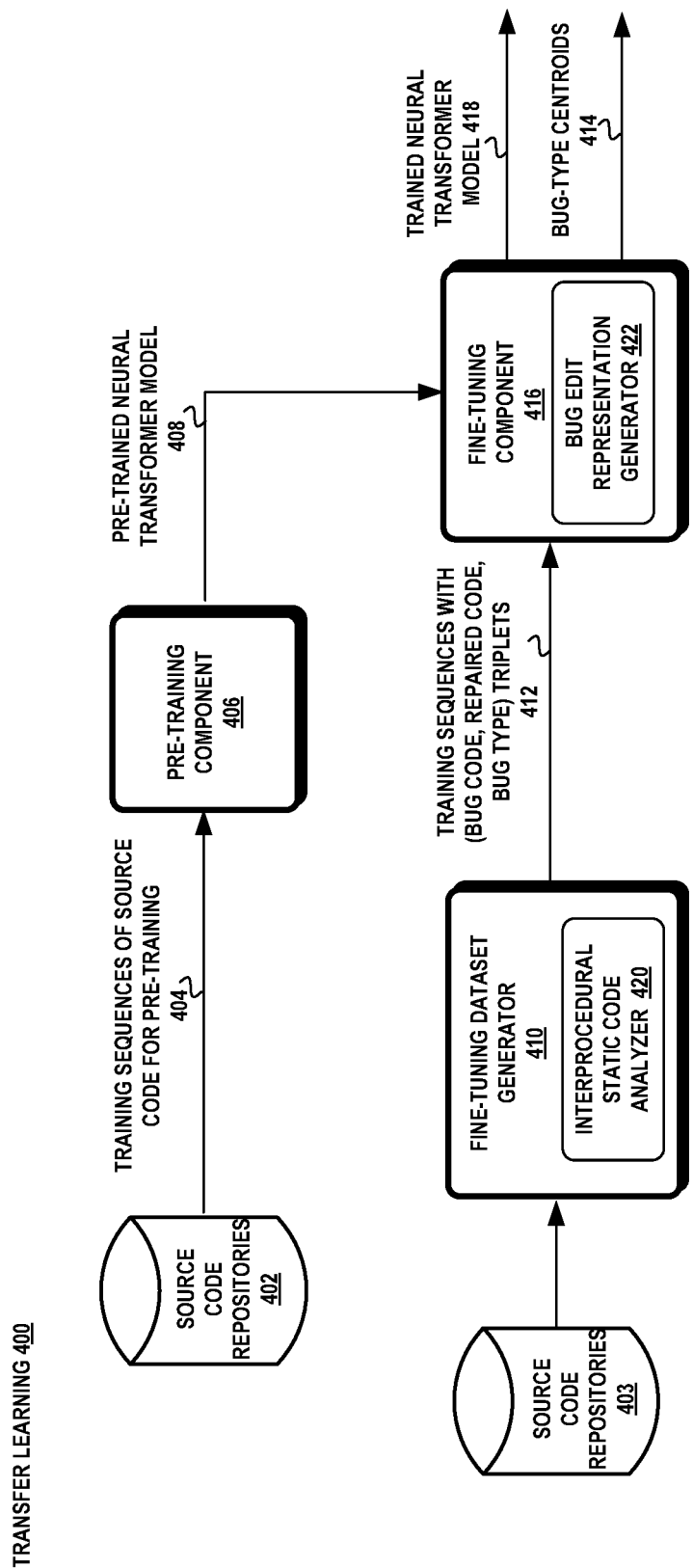
FIG. 4 is a schematic diagram illustrating an exemplary transfer learning system for training the neural transformer model.

FIG. 4 illustrates the transfer learning system 400 to train a neural transformer model with attention 418. Turning to FIG. 4, a pre-training component 406 generates an unsupervised training dataset 404 from source code files from various source code repositories 402. The pre-training component 406 trains the pre-trained neural transformer model 408 which is then fined tuned by the fine-tuning component 416. The fine-tuning dataset generator 410 generates a training dataset of triplets 412 that includes a code snippet with a bug, the repaired code snippet and a type of the bug. The fine-tuning dataset generator 410 obtains the buggy code snippets from a source code repository having repaired source code 403.

The fine-tuning dataset generator 410 uses an interprocedural static code analyzer 420 to classify a bug type. The fine-tuning component 416 includes a bug edit representation generator 422 to compute an edit embedding representation for the bug during training, which will be replaced with a bug centroid for each bug type during inference, when the bug repair is not available.

A bug fix or repair is represented by the triplet bf={b, f, t), where b is the buggy code, f is the bug repair, and t is the type of bug that was fixed. Source code with a bug is obtained from a version-controlled source code repository 403. The fine-tuning dataset generator 406 analyzes the source code repository 403 for changes made to a repository in order to identify the bugs introduced or fixed in a commit A commit adds the latest changes made to a source code file to the repository. The files involved in the changed code are identified and input into a static analyzer to identity the bug type t. The bug type, the buggy code and the repaired code are extracted to form the triplet bf={b, f, t).

The fine-tuning component 416 trains the pre-trained neural transformer model 408 with a large supervised training dataset of triplets 412. The triplets (b, f, t) represent translation tasks that teach the model to learn to translate an input sequence of buggy code and its bug type into an output sequence that contains the repaired code.

The fine-tuning component 416 also generates a bug-type edit representation for each bug type. A bug-type edit representation is a vector representation of the edits performed to generate a bug fix for a certain bug type. A developer performs a sequence of edits to transform the code b into the code f. The bug-type edit representation is a vector representation of the edits that transforms the code b into the code f. A representation function G maps an edit operation b→f to an embedding vector $G(b, f) \subset R^d$, where d is the embedding dimension.

Given an edit representation function G and a triplet, (b, f, t), clusters are identified in the embedding space for each bug type. For each bug-type cluster, a bug-type embedding is generated as a centroid vector g(type) 414. The centroid embedding for a particular bug type is used to inform the neural transformer model during the inference process, when predicting a bug repair.

Pre-Training

Figure 5:
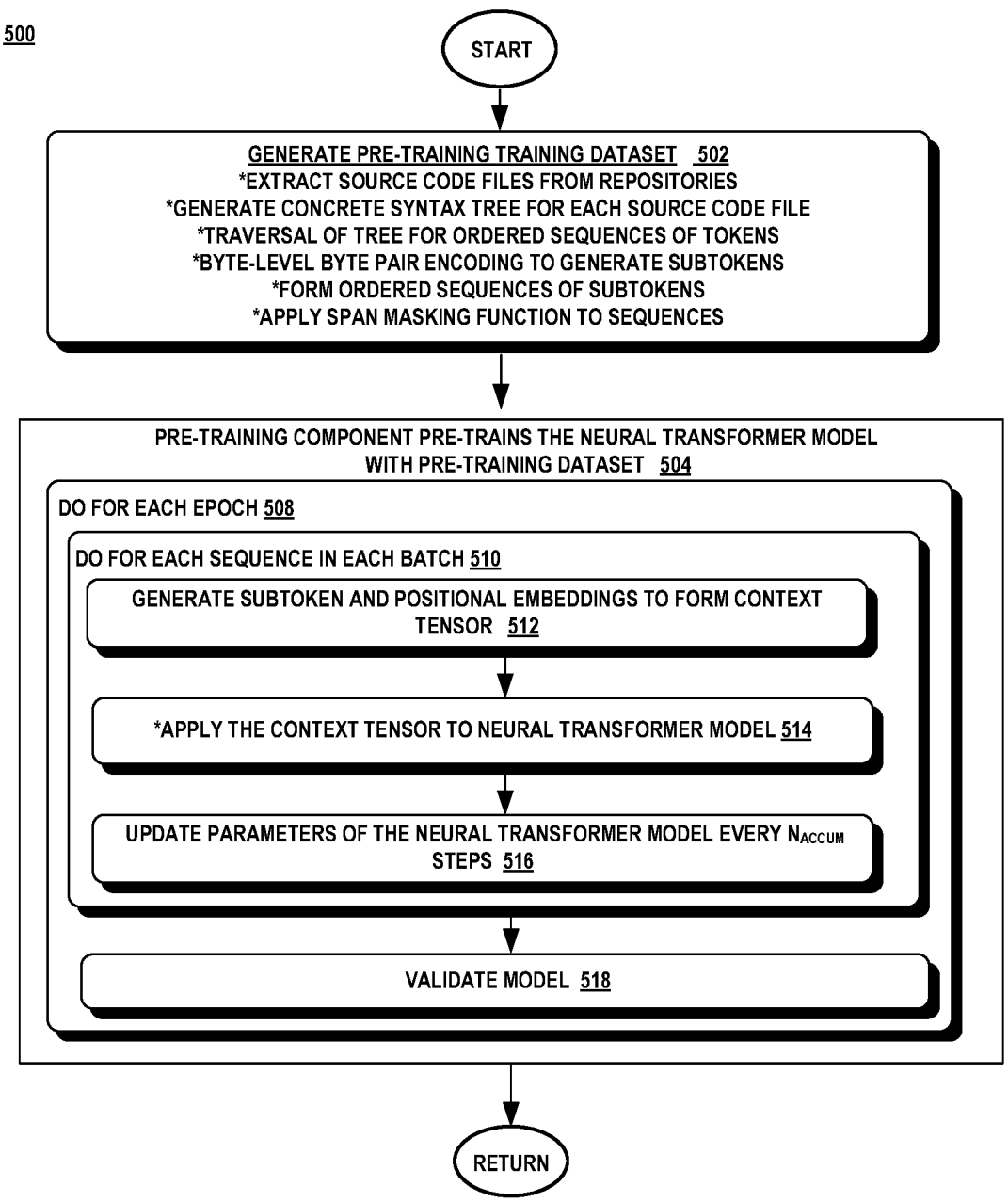
FIG. 5 is flow diagram illustrating an exemplary method for pre-training the neural transformer model.
Figure 6:
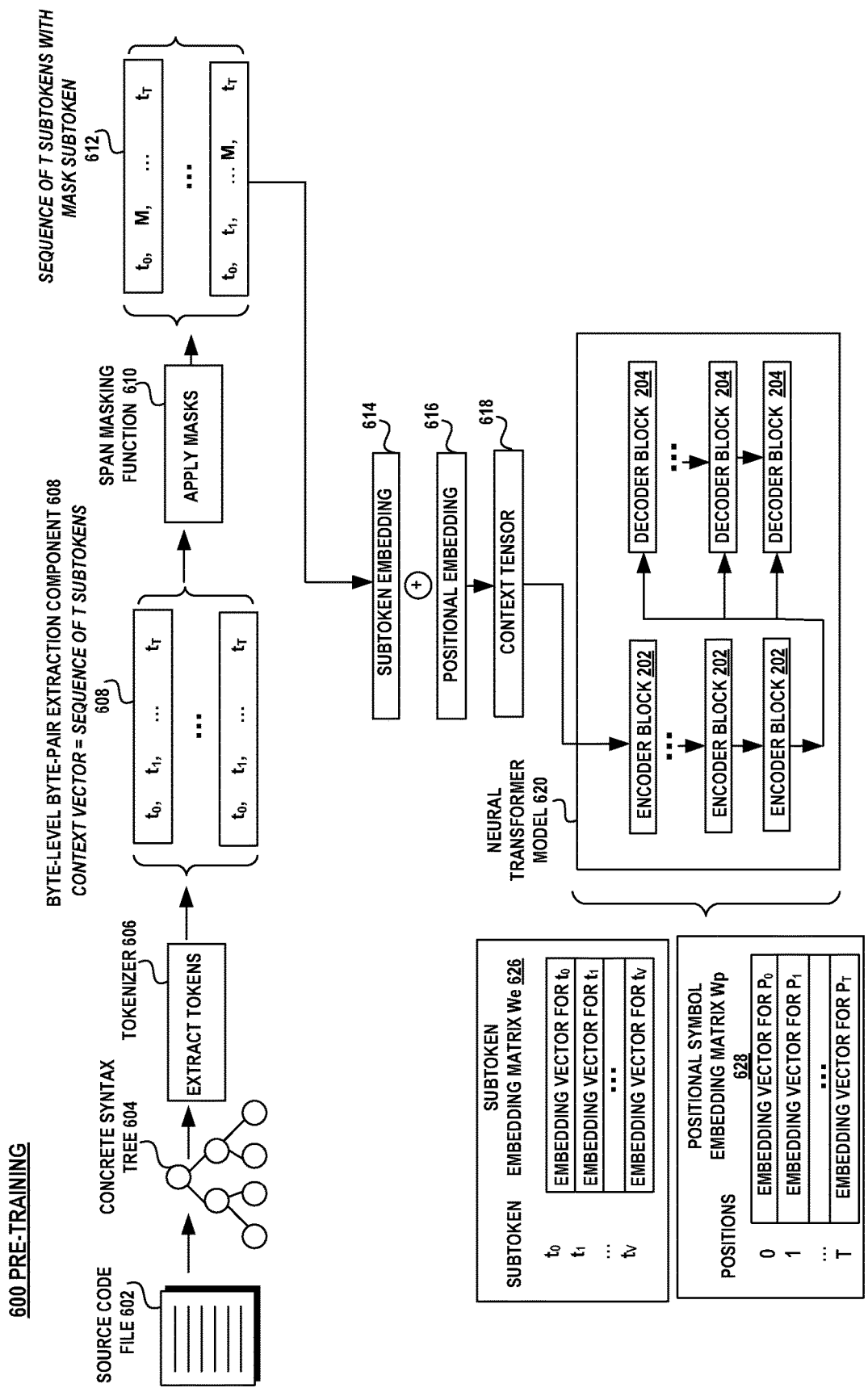
FIG. 6 is a schematic diagram illustrating an exemplary process for pre-training the neural transformer model and the components used therein.

FIGS. 5 and 6 illustrate an exemplary method for pre-training the neural transformer model. Turning to FIGS. 4, 5 and 6, the pre-training training component 406 generates a training dataset to pre-train the neural transformer model (block 502). The pre-training component 406 generates a pre-training dataset from a diverse corpus of unlabeled source code programs or files 602. This is referred to as unsupervised learning since the model draws inferences from the input data without labeled responses. The pre-training component 406 extracts selected source code files 602 from various source code repositories 402. The source code files 602 contain context beyond method bodies, method signatures, and docstrings, such as imports, globals, comments, and scripts. (Collectively, block 502).

A source code repository 402 may be a file archive and web hosting facility that stores large amounts of source code either privately or publicly. A source code repository 402 can be structured as a version control system, such as GIT, Mercurial, etc. The source code files residing in the source code repository 402 vary and may be written in different programming languages. The selected source code files 602 can come from different domains, such as without limitation, scientific computing, web development, dataflow programming, machine learning, and the like. (Collectively, block 502).

The pre-training component 406 transforms each of the selected source code files 602 into a concrete syntax tree 604. The concrete syntax tree 604 represents the source code text in the parsed form. The concrete syntax tree 604 may also be a parse tree. A concrete syntax tree 604 represents the syntactic structure of a program in a hierarchical or tree structure. The concrete syntax tree 604 is an n-ary tree data structure that includes nodes that represent a construct in the grammar of the programming language of a program. The concrete syntax tree 604 includes one root node, multiple internal nodes, and multiple terminal nodes. The terminal nodes represent the tokens. A token is a symbol that represents an operand or an operator. The concrete syntax tree 604 differs from an abstract syntax tree where the terminal nodes represent operands. (Collectively, block 502).

The pre-training component 406 uses a tokenizer 606 to extract tokens from the concrete syntax tree 604. The frequently-used elements in a programming language are encoded into tokens and the less frequently-occurring elements are encoded into combinations of characters referred to as subtokens. For simplicity, the term subtoken shall include tokens and subtokens. (Collectively, block 502).

The pre-training component 406 uses a byte-level byte-pair extraction algorithm 608 to generate T-ordered sequences of subtokens 609, where T is the maximum context length. Byte-level byte-pair encoding (BBPE) is used to generate the vocabulary used by the neural transformer model. A text string, either a sequence of source code or a natural language text, is represented as a sequence of Unicode Transform Format, UTF-8 bytes. The input text string of subtokens is encoded as a sequence of UTF-8 bytes, where a subtoken is encoded into one to four bytes. A byte sequence is then partitioned into byte-level subwords, referred to as byte n-grams. (Collectively, block 502).

The byte-level subwords are generated using the Byte Pair Encoding (BPE) algorithm, which extracts the k most frequently-occurring n-grams. The result is a vocabulary size of the k most frequently-occurring n-grams. An n-gram is a contiguous sequence of n subtokens from an input text string of either source code or natural language text. This type of encoding does not rely on knowing the underlying language making it suitable for an input sequence of text strings that contain source code or natural language text. The ordered sequences of UTF-8 bytes are translated into a T-ordered sequence of subtokens which are vector representations of a source code fragment or natural language text. The T-ordered sequence of subtokens are represented in a context vector 610. (Collectively, block 502).

A denoising function, such as a span masking function 610, is then applied to each sequence that randomly masks out a subset of subtokens and the masked span of subtokens is replaced with a mask subtoken, M. The model is trained with the masked sequences to learn to reconstruct the original sequence without the masked subtokens. In one aspect, the mask subtoken replaces a span of subtokens. The number of text spans and the span lengths are randomly generated and each span is replaced with a single mask subtoken. The masked denoising is based on the doze task of evaluating human language-learners' proficiency, in which humans are given a foreign language with missing words, and are asked to correctly choose the missing word. The benefit of span-masking denoising in pre-training is that the model learns the desired language in an unsupervised fashion, but also is bi-directional in the sense that it learns the relationships of words both before and after their occurrence. (Collectively, block 502).

The pre-training component 406 then pre-trains the neural transformer model with the pre-training dataset 404 (block 504). Neural transformer models are trained iteratively, making multiple passes over the training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of sequences running through the training process. (Collectively, block 504).

The neural transformer model has multiple blocks and layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are learned.

In one aspect, the hyperparameters may include the following: (1) subtoken and position embedding layers of dimensions: 30000×768, and 1024×768 respectively; (2) the configuration of the neural transformer model with six encoder blocks and six decoder blocks; (3) for the training procedure: denoising auto-encoder, with a cross-entropy loss optimization objective; the sequence length of 1024 symbols; a mini-batch size of 8; the gradient accumulation steps for each weight update is 8; the Adam stochastic optimization procedure is used to train the feed forward neural network; and the learning rate is 0.0001; (4) the data normalization procedure: normalize all string and numerical literals, keeping the ten most frequent; and (5) the vocabulary encoding procedure: byte-level byte-pair encoding, preserve the ten most frequent string and numerical literals encoding them as a single token during byte-level byte-pair encoding procedure; and introduce special control flow tokens to denote end-of-line, end-of-file, end-of-method, end-of docstring, dedent, and indent symbols.

For each sequence of each batch in each epoch (blocks 508, 510), the T-ordered sequences of subtokens are then mapped into numeric vectors and then into respective subtoken embeddings 614 and positional embeddings 616 (block 512). An embedding is a learned representation for the text-based subtokens where subtokens that have a common meaning have a common representation. An embedding is a mapping of discrete categorical variables to a vector of continuous numbers. There is an embedding for each subtoken in the vocabulary 614 and a corresponding positional embedding 616. The subtoken embedding 614 represents the learned representation for the subtoken. The neural transformer model does not read each subtoken sequentially and as such, has no knowledge of the subtoken's position in a sequence without additional position information. The positional embedding 616 is used to embed position information about a subtoken's position in a sequence into the neural transformer model 620.

Initial values are generated for the subtoken embedding and positional embeddings of each sequence which are then used to form a context tensor 618. Thereafter, the neural transformer model 620 learns the values for each embedding. Upon the completion of the training phase, the embeddings for each subtoken and the positional embeddings are saved into respective matrices for later use. There is a subtoken embedding matrix, We, 626 that contains an embedding vector for each subtoken t, i=0 . . . V, and a positional embedding matrix, Wp, 628 that contains an embedding vector $P_j$, j=0 . . . T, for each position, where V is the size of the vocabulary and T is the length of the subtoken sequence. (Collectively, block 512).

The encoder blocks 202 of the neural transformer model 620 take the context tensor 618 as input and passes it through the multiple blocks of multi-head attention and feed-forward neural network to finally produce a contextualized token representation. The decoder blocks 204 of the neural transformer model 620 takes a shifted sequence of an output embedding as input. (Collectively, block 514).

The feed forward neural networks in the encoder blocks 202 and the decoder blocks 204 are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique.

In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 514).

At the completion of each batch, the parameters of the neural transformer model are updated at a preconfigured frequency denoted as Naccum. Naccum is a gradient accumulation frequency and in one aspect has a value of 8. The parameters include the subtoken embeddings and the positional embeddings which are stored in a respective embedding matrix. (Collectively, block 516).

Next, the neural transformer model is validated. Before the neural transformer model is trained, a set of hyperparameters is selected randomly and then tuned to achieve a desired performance. The neural transformer model is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 518).

Fine-Tuning

After the pre-training is performed, the neural transformer model is fine-tuned on individual supervised tasks. The fine-tuning training dataset is generated from software bugs and repairs from various programs in different programming languages. A static analyzer is used to identify the type of software bug. For each bug type category, a canonical edit embedding representation is generated which aims to encapsulate essential information on the bug type and the code changes needed to fix it. A bug type edit centroid is computed for each bug type from the canonical edit embedding of each bug type and used during inference in the decoding phase to generate the bug repair.

The fine-tuning ensures that the neural transformer model understands the relationship between a code snippet with bugs, the bug type, and its repair by training the model with sequences of these features. The repetition of the features improves the model's ability to learn the relationships between the different features. Bug-fixing edits carry meaningful semantic information about bugs, and are thus capable of improving accuracy of the program repair system. During the fine-tuning training stage, the exact bug-fixing edit for a given buggy code snippet and a fixing code snippet is used. For a given training sample, the edit embedding vector is concatenated with the encoder output vector and is utilized to initialize the decoder state, it is also concatenated with output embedding at each temporal step. However, the exact bug-fixing edits are not known ahead of time during inference. Given that embedding vectors of bug-fixing edits belonging to a given bug type are geometrically close and are forming clusters in the embedding space, centroids of these clusters are used as an alternative way of passing semantic information about bug-fixing edits to the model decoder during inference time.

Figure 7:
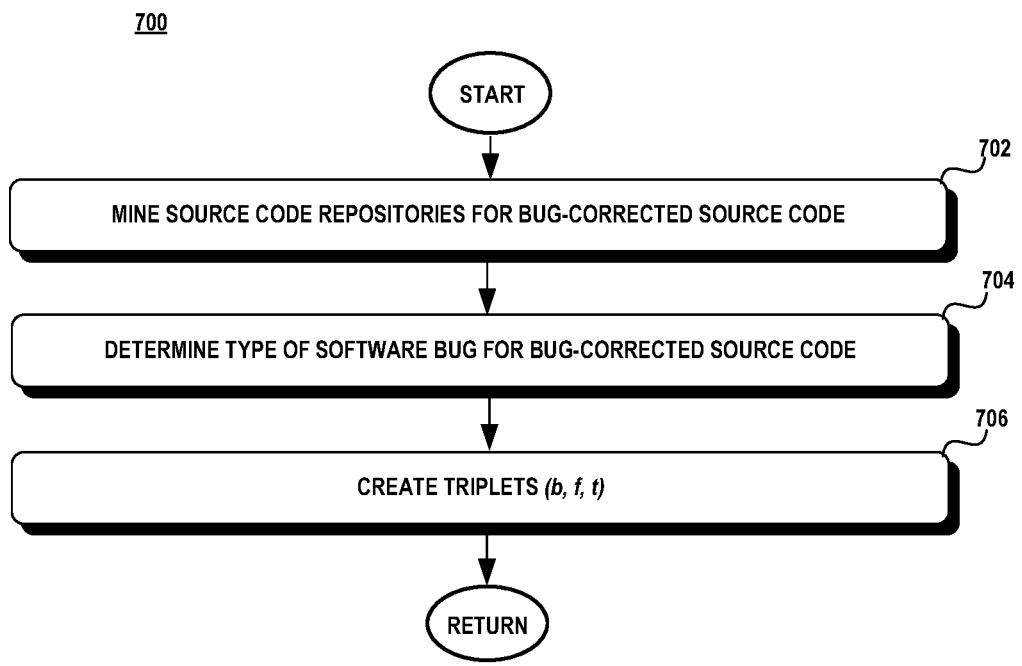
FIG. 7 is a flow diagram illustrating an exemplary method for generating the fine-tuning dataset for the neural transformer model.

Turning to FIGS. 4 and 7, the fine-tuning dataset generator 410 mines various source code repositories 403 for source code that has been corrected due to a software bug. The source code file containing the original code with the source code bug and the source code file containing the bug repair are obtained from the source code repository. (Collectively, block 702).

The fine-tuning dataset generator 410 uses a static code analyzer to determine the type of software bug for the source code file having the bug. In one aspect, an interprocedural static analyzer 420 is used to analyze a source code file to determine whether the source code has a software bug and to identity the type. An interprocedural static code analyzer 420 analyzes program code without executing the program. The analysis is interprocedural rather than intraprocedural. An intraprocedural analysis is performed within a method, otherwise referred to as a procedure or function. An interprocedural analysis spans multiple files or methods, including all the methods in the entire program. An interprocedural static code analysis is able to detect memory safety faults or bugs that span multiple files or methods, such as null pointer dereferencing and memory leaks, which would be missed if intraprocedural static analysis were used. (Collectively, block 704).

In one aspect, the interprocedural static code analyzer 420 is Facebook®'s Infer. Infer identifies memory safety errors, such as, null pointer dereference, memory leak, immutable cast, empty vector access, and thread safety violation. Infer is based on separation logic that performs Hoare-logic reasoning about programs that mutate data structures. Infer uses an analysis language to represent a program in a simpler instruction set that describes the program's actions on a symbolic heap. Infer symbolically executes the analysis language instructions over a symbolic heap according to a set of separation logic proof rules in order to discover program paths with the symbolic heap that violate heap-based properties. In this manner, Infer is able to detect a memory safety-type program error and to identify the particular type. (Collectively, block 704).

The fine-tuning dataset generator 410 forms training sequences of triplets including the code snippet containing the software bug, the code snippet of the repair, and the bug type identified from the static analyzer (block 706).

Fine-Tuning Training

Figure 8:
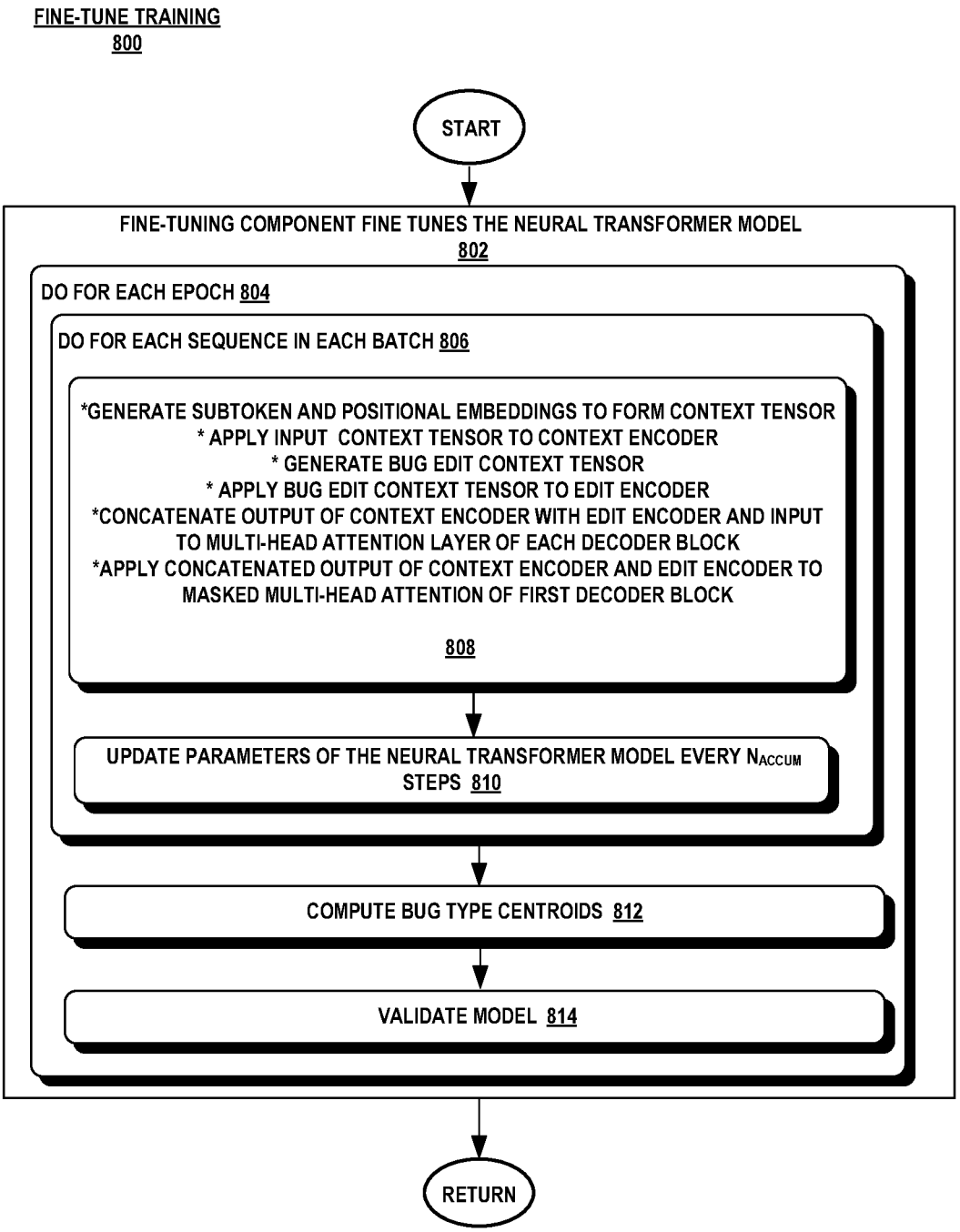
FIG. 8 is a flow diagram illustrating an exemplary method for fine-tuning the neural transformer model.
Figure 9:
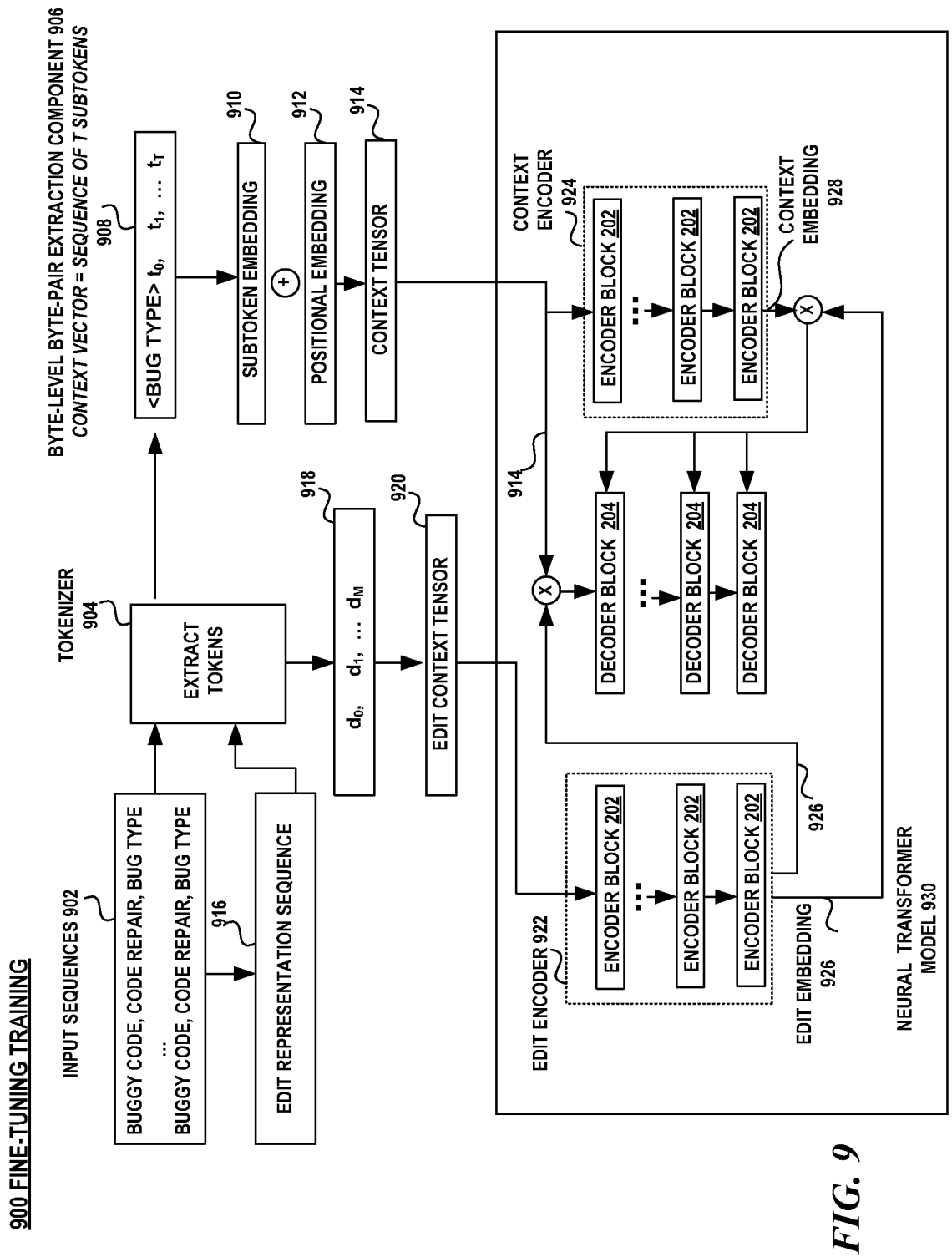
FIG. 9 is a schematic diagram illustrating an exemplary process for fine-tuning the neural transformer model and the components used therein.

Referring to FIGS. 4, 8 and 9, the fine-tuning component 416 trains the neural transformer model and an edit representation function G with input sequences 902 having a code snippet with buggy code (buggy code), the associated code repair (code repair), and the associated bug type (bug type). The fine-tuning dataset consists of bugs and fixes, and associated bug types. A bug-fixing edit representation is a vector representation of the edits performed to generate a bug fix for a certain bug-fix pair. A developer performs a sequence of edits to transform the code b into the code f. The bug-fixing edit representation is a vector representation of the edits that transforms the code b into the code f A representation function G maps an edit operation b→f to an embedding vector $G(b, f) \subset R^d$, where d is the embedding dimension. (Collectively, block 802).

Given an edit representation function G and a triplet, (b, f, t), clusters are identified in the embedding space for each bug type. For each bug-type cluster, a bug-type embedding is generated as a centroid vector g(type) 414. The centroid embedding for a particular bug type is used to inform the neural transformer model during the inference process. The edit representation function G is the edit encoder 922 of fine-tuned model 416, 420. The bug edit representation generator 422 uses the edit encoder 922. (Collectively, block 802).

A tokenizer 904 generates a concrete syntax tree for the buggy code and the repaired code from which an ordered sequence of tokens is extracted 902. The tokens are then converted into a byte-level byte pair encoded representation using a byte-level byte-pair extraction component 906 and then into an ordered sequence of subtokens 908. The input sequence 908 is prepended with the bug type, <BUG TYPE>. (Collectively, block 802).

Neural transformer models are trained iteratively, making multiple passes over the training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of sequences running through the training process.

The neural transformer model has multiple blocks and layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are fine tuned for the particular translation task.

For each sequence of each batch in each epoch (blocks 804, 806), the T-ordered sequences of subtokens are then mapped into numeric vectors and then into respective subtoken embeddings 910 and positional embeddings 912 to form a context tensor (block 808). Initial values for the subtoken embedding and positional embeddings of each sequence were learned in the pre-training and are now updated based on the input sequences (block 808).

An edit representation sequence 916 is generated to include the edits made to the buggy source code to produce the bug repair. The tokenizer 904 extracts tokens from the edit representation sequence 916, to form a tokenized sequence, $d_0, d_1, \ldots, d_M$, 918 which forms the edit context tensor 920. The edit context tensor 920 is input into an edit encoder 922 which learns an associated edit embedding 926. The encoder blocks of the edit encoder take the edit context tensor as input and passes it through multiple blocks of multi-head attention and feed-forward neural network in each encoder layer to finally produce an edit embedding 926. (Collectively, block 808).

The encoder blocks 202 of the neural transformer model 920 take the context tensor 914 as input and pass it through the multiple blocks of multi-head attention and feed-forward neural network in each encoder layer to finally produce a context embedding 928. The context embedding 928 is concatenated with the edit embedding 926 and input into each multi-head attention layer of each decoder block. The initial decoder block 204 of the neural transformer model 920 takes a shifted sequence of an output embedding from the previous time step which is concatenated with the edit embedding 926. (Collectively, block 808).

The feed forward neural networks in the encoder blocks 202 and the decoder blocks 204 are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 808).

At the completion of each batch, the parameters of the neural transformer model are updated at a preconfigured frequency denoted as Naccum. Naccum is a gradient accumulation frequency and in one aspect has a value of 8. The parameters include the subtoken embeddings and the positional embeddings which are stored in a respective embedding matrix. (Collectively, block 810).

In addition, the bug type centroids are computed for each bug type and stored in a bug centroid table for use during the inference phase (block 812).

Next, the neural transformer model is validated. The neural transformer model is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 814).

Attention now turns to discussion of the use of the neural transformer model in an inference system.

Inference Phase

The inference phase of the automated program repair tool relies on a beam search to generate one or more code repair strings corresponding to a buggy code snippet, bug type, and bug-type centroid. The decoder's computation at training time can be parallelized using masked self-attention but during inference, the subtokens are generated one token at a time. The neural transformer model factorizes the probability of the target subtokens in an input sequence into a product of conditional probabilities for each subtoken using the formula: $p(t_1, \ldots t_m|s) = \Pi_{i=1}^{m} p(t_i|t_1, \ldots, t_{i-1}, s)$. During inference, the calculation of $\arg\max_t p(t|s)$ is complex and extremely time consuming making the model difficult for real-time applications. Beam search is an approximation algorithm that performs faster.

The beam search uses the probability distribution generated by the neural transformer model to identify the top k subtokens likely to be the next subtoken in a candidate code repair sequence. The beam search expands the search by instantiating new partial sequences using each of the selected subtokens identified by the neural transformer model's probability distribution. The search continues generating new partial sequences from the top k subtokens identified by the output distributions from the neural transformer model until the search ends. The search may end when the end-of-file appears as the most probable next subtoken.

A beam search uses a breadth-first search to build a search tree. The search tree is composed of nodes at one or more inference levels. Each node represents a probability distribution generated by the neural transformer model for the subtokens in the model vocabulary. At each level, only the top k subtokens having the highest probabilities from the output distribution generated by the neural transformer model are expanded to the next inference level. The variable k is preconfigured and referred to as the beam width. Each of the k subtokens is then expanded into a search that updates the current context sequence with the selected subtoken to input into the neural transformer model to generate an additional probability distribution for the next subtoken in a sequence. This process is repeated until the end-of-file token is predicted as being the next likely subtoken candidate.

Figure 10A:
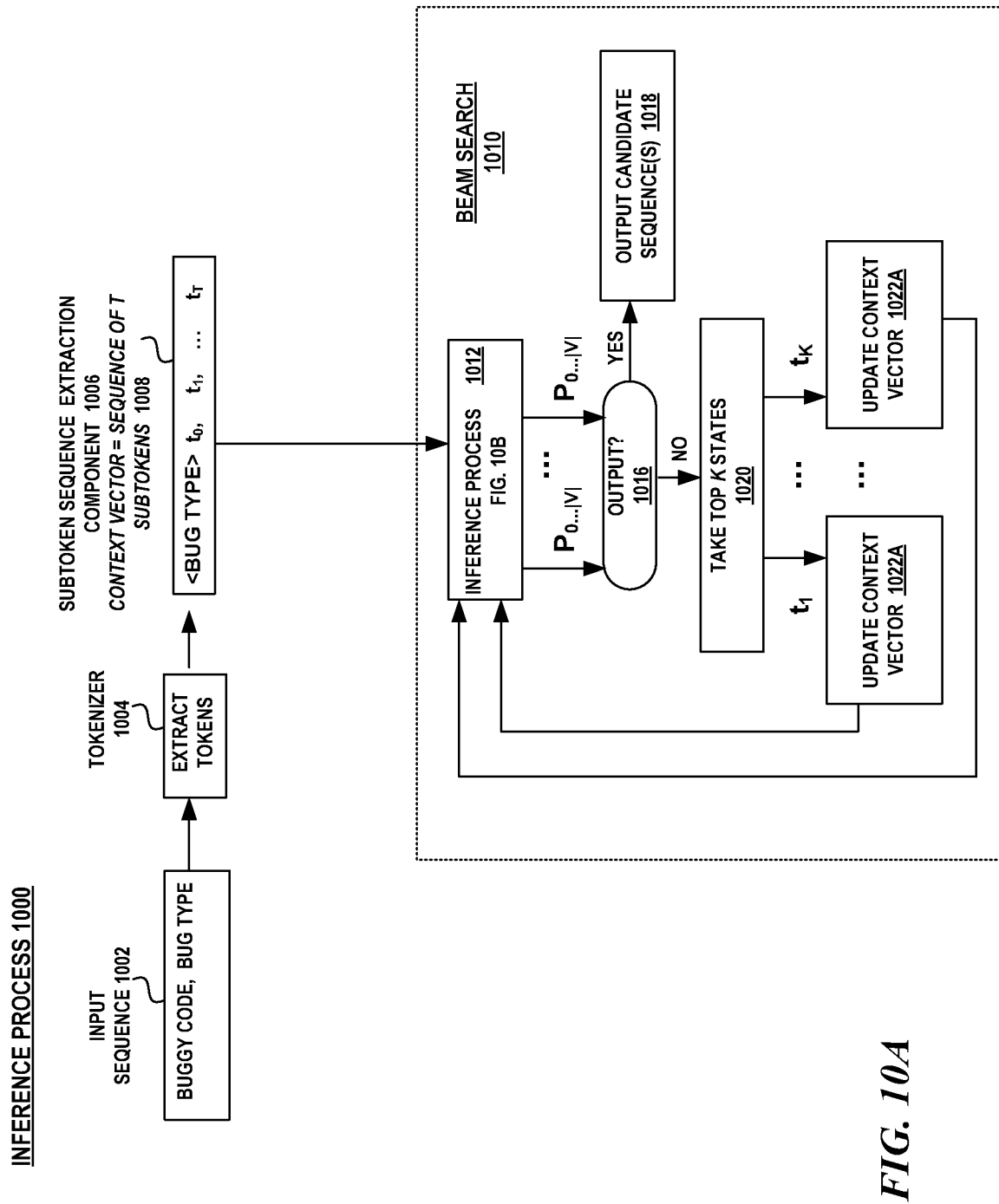
FIGS. 10A-10B are schematic diagrams illustrating the inference process that uses the neural transformer model.

Turning to FIG. 10A, there is shown components of the inference phase 1000. An input sequence 1002 containing a buggy code snippet 1002 and its bug type is provided which is transformed into a corresponding concrete syntax tree that is traversed, by a tokenizer 1004, to extract tokens and/or subtokens in an ordered sequence. The bug type is added to the ordered sequences at the beginning of the sequence. The ordered sequence of T subtokens is then vectorized into a context vector 1008 using a byte-level byte-pair extraction component 1006.

The beam search 1010 uses the context vector 1008 to initiate an inference process 1012 using the probability distribution generated from the neural transformer model, $P_0 \ldots P_{|V|}$ (block 1012). If the probability distribution indicates that an end-of-file token is the most likely subtoken to follow in a partial candidate sequence (block 1016—yes), then the top k candidate sequences are output (block 1018). Otherwise, the beam search 1010 takes the top k states or subtokens identified from the probability distribution generated by the neural transformer model in the inference process (block 1020). A new context vector is generated for each of the k states, $c_1, \ldots c_k$, using the new subtoken in the context vector (blocks 1022A, 1022B). The new context vectors are then input into the inference process (blocks 1022A, 1022B, 1012). The beam search 1010 ends when the end-of-file token is selected as the most likely candidate to complete a partial candidate sequence.

Figure 10B:
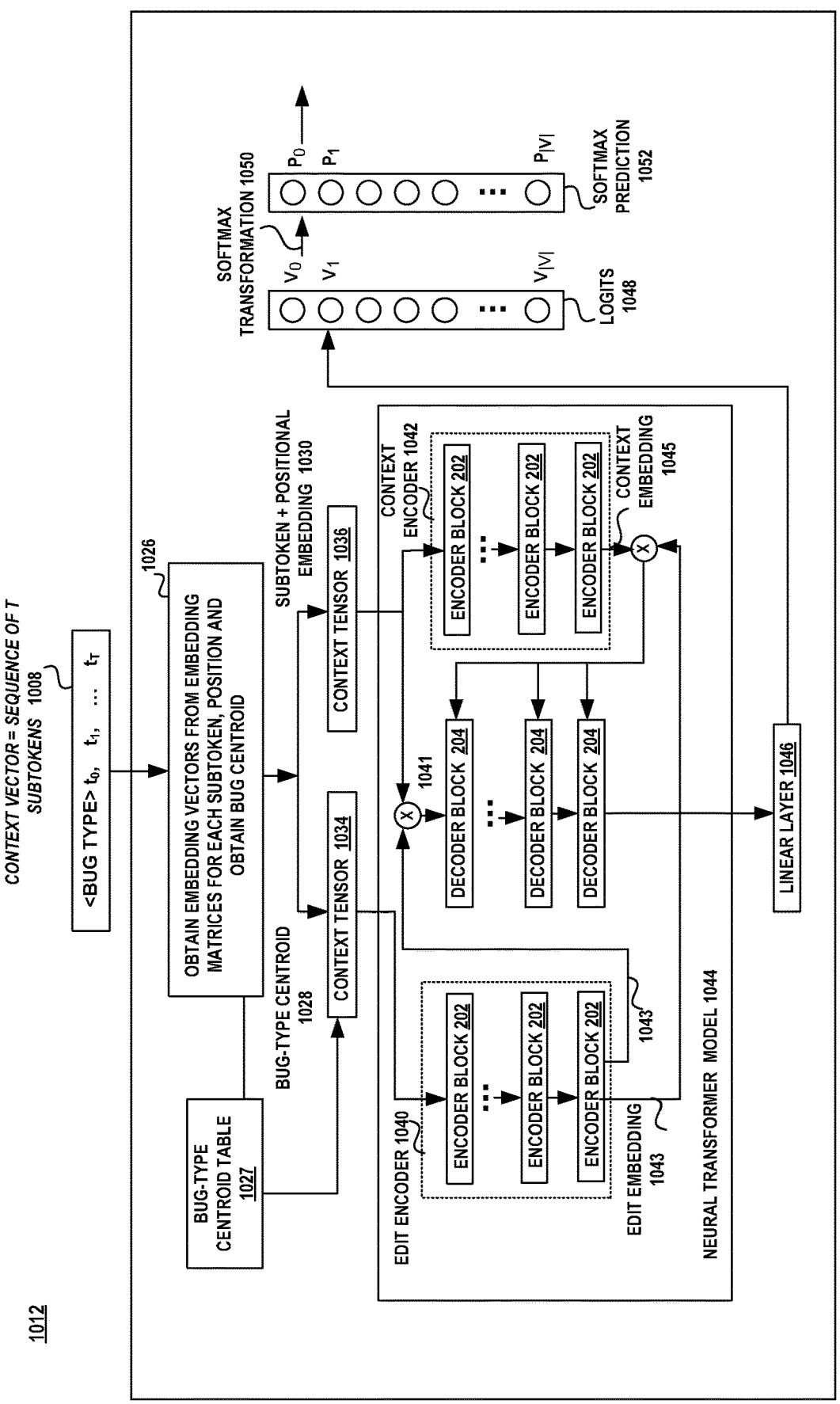

FIG. 10B illustrates an exemplary inference process 1012. An embedding vector for each subtoken in a sequence 1008 is obtained from the subtoken embedding matrix 1028 and its corresponding positional vector from the positional embedding matrix 1030. A bug-type centroid 1028 corresponding to the bug type is obtained from the bug-type centroid table 1027.

The subtoken embedding vector and its corresponding positional embedding vector 1030 are combined to form context tensor 1036. Context tensor 1036 is input into the context encoder 1042 and concatenated with the edit embedding 1043 output from the edit encoder 1040. The concatenated embedding 1041 is input into the first decoder block. The context tensor 1034 is input into the first encoder block of the edit encoder 1040 and the output of each encoder block is passed to the next encoder block forming edit embedding 1043. Edit embedding 1043 is concatenated with the context embedding 1045 and input into each multi-attention layer of each decoder block 204.

The last decoder block outputs a vector of floating point numbers that is projected by the linear layer 1036 into unnormalized predictions or logits $V_0 \ldots V_{|V|}$ 1042. The logits 1042 are normalized using the softmax function 1044 to generate the softmax prediction 1046 $P_0 \ldots P_{|V|}$.

Automated Bug Repair Tool

In one aspect, the neural transformer model is used as an automated program repair tool. The automated program repair tool may be part of an integrated development environment (IDE) or part of a web service that analyzes source code for source code bugs and when found, provides a bug fix.

Figure 11A:
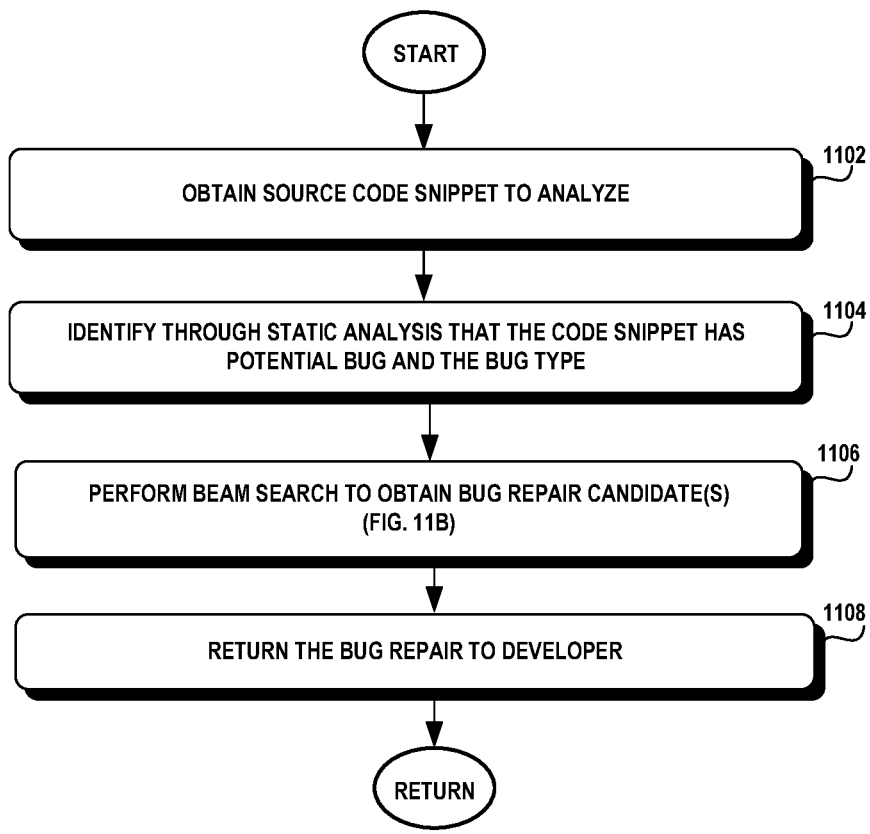
FIG. 11A-11B is a flow chart illustrating an exemplary method for generating candidate bug repair code snippets using the neural transformer model.

Referring to FIG. 11A, the automated bug repair tool receives source code to analyze (block 1102). The source code is analyzed through static analysis, such as the interprocedural static analysis tool described above, to identify any potential software bugs and the corresponding bug type (block 1104). The automated bug repair tool performs a beam search using the neural transformer model to predict one or more bug repair candidates (block 1106). The top k candidate bug repairs are returned to the developer (block 1108).

Figure 11B:
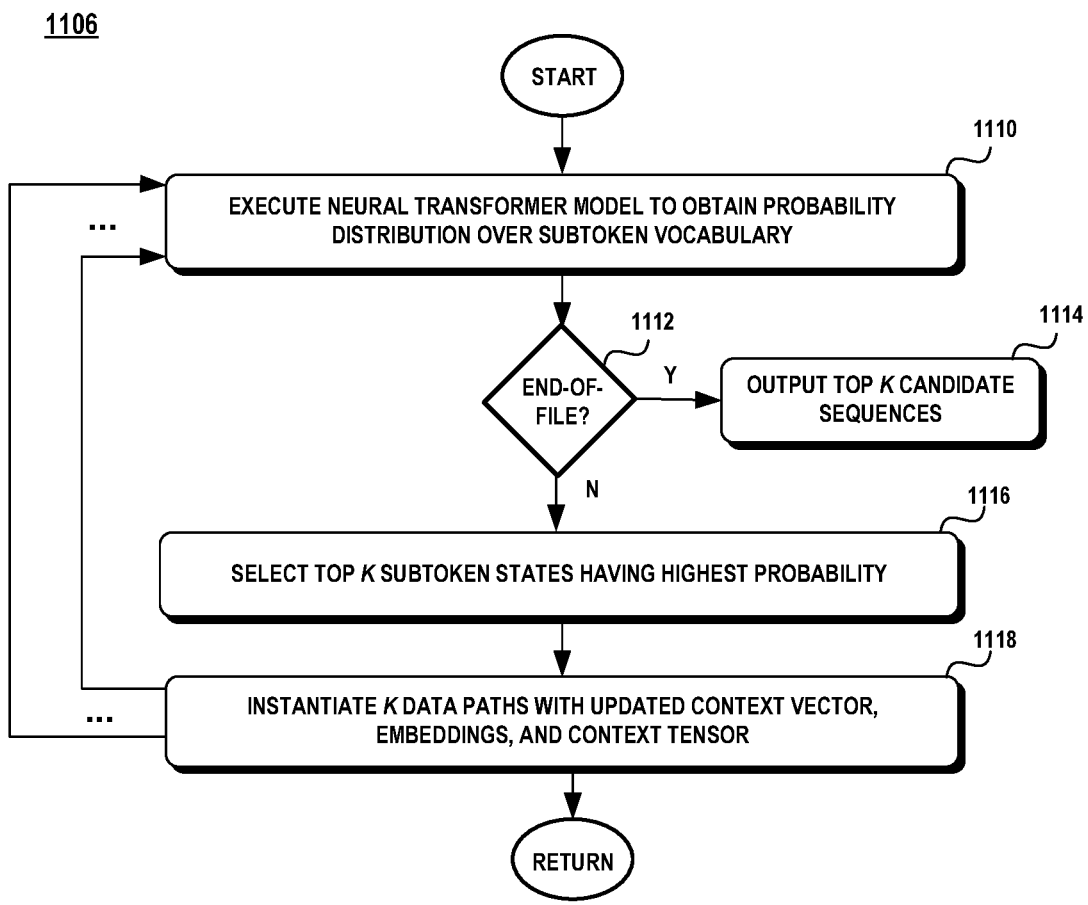

Turning to FIG. 11B, the beam search uses the neural transformer model to generate a probability distribution for the subtoken vocabulary (block 1110). If the probability distribution indicates that the next likely token is the end-of-docstring token, then the beam search is finished (block 1112—yes) and the top k candidate sequences are returned to the user interface (block 1114). Otherwise (block 1112—no), the top k subtokens to complete a partial sequence are selected (block 1116).

Each of the selected subtokens is then input in a respective context vector and has a separate data path through the neural transformer model again. The context vector utilizes the selected subtoken in the current context vector with the last subtoken removed. The new context vector will consist of T subtokens with the selected subtoken $t_k$ added to the beginning of the sequence with the last subtoken removed from the sequence. If the current context vector consists of a subtoken sequence consisting of $t_0, t_1, \ldots, t_T$, then the new context vector will consist of $t_k, t_0, t_1, \ldots, t_{T-1}$. (Collectively, block 1118).

Exemplary Operating Environment

Figure 12:
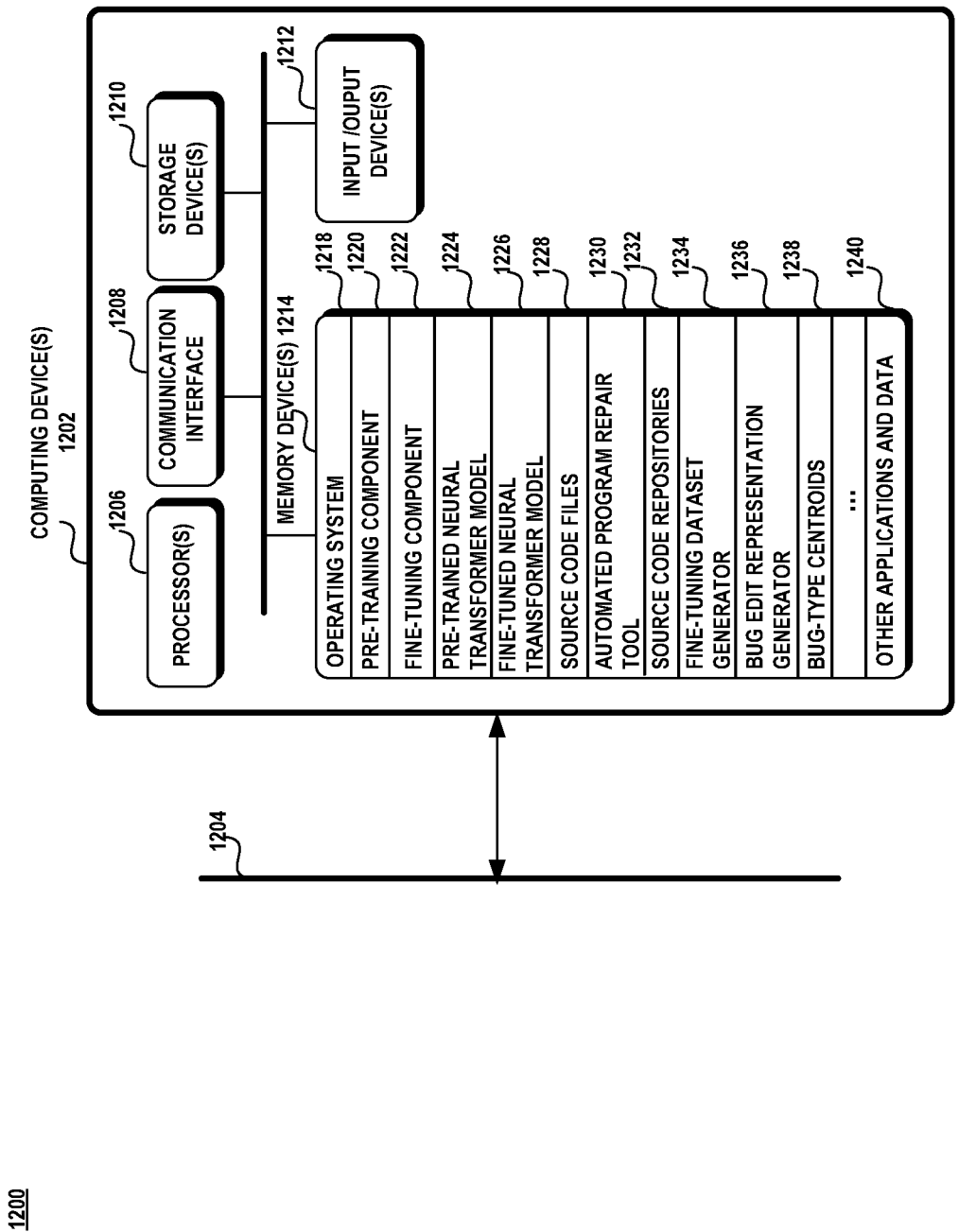
FIG. 12 is a block diagram illustrating an operating environment.

Attention now turns to a discussion of an exemplary operating environment. FIG. 12 illustrates an exemplary operating environment 1200 in which one or more computing devices 1202 are used to train the neural transformer model use the neural transformer model for automated program repair. However, it should be noted that the aspects disclosed herein is not constrained to any particular configuration of devices. Computing devices 1202 may be configured as a cloud service that generates the neural transformer model as a service for other code completion systems. It should be noted that the operating environment is not limited to any particular configuration and other configurations are possible.

A computing device 1202 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1200 may be configured in a network environment, a distributed environment, a multi-processor environment, or a stand-alone computing device having access to remote or local storage devices.

The computing device 1202 may include one or more processors 1206, one or more communication interfaces 1208, one or more storage devices 1210, one or more input/output devices 1212, and one or more memory devices 1214. A processor 1206 may be any commercially available or customized processor and may include dual microprocessors and multi-processor architectures. A communication interface 1208 facilitates wired or wireless communications between the computing device 1202 and other devices. A storage device 1210 may be computer-readable medium that does not contain propagating signals, such as modulated data signals transmitted through a carrier wave. Examples of a storage device 1210 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 1210 in the computing device 1202. The input/output devices 1214 may include a keyboard, mouse, pen, voice input device, touch input device, display, speakers, printers, etc., and any combination thereof.

A memory device 1214 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 1214 may also include one or more external storage devices or remotely located storage devices that do not pertain to propagated signals, such as modulated data signals transmitted through a carrier wave.

The memory device 1214 may contain instructions, components, and data. A component is a software program that performs a specific function and is otherwise known as a module, program, component, and/or application. The memory device 1214 may include an operating system 1218, a pre-training component 1220, a fine-tuning component 1222, a pre-trained neural transformer model 1224, a fine-tuned neural transformer model 1226, source code files 1228, an automated program repair tool 1230, source code repositories 1232, a fine-tuning training dataset 1234, bug edit representation generator 1236, bug-type centroids 1238, and other applications and data 1230.

The computing devices 1202 may be communicatively coupled via a network 1206. The network 1206 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 1206 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multi-media Messaging Service (MMS), or any other communication protocols and/or technologies.

CONCLUSION

A system is disclosed comprising one or more processors and a memory. The memory stores one or more programs that are configured to be executed by the one or more processors. The one or more programs include instructions that: obtain a code snippet with a source code bug and an annotated bug type; predict a bug repair for the code snippet from a neural transformer model with attention based on the code snippet and the annotated bug type; and utilize the predicted bug repair to repair the code snippet. In one aspect, the one or more programs include further instructions that: identify the annotated bug type using an interprocedural static analyzer. In an aspect, the one or more programs include further instructions that: pre-train the neural transformer model with an unsupervised training dataset, the unsupervised training dataset including source code snippets.

In an aspect, the one or more programs include further instructions that: fine-tune the pre-trained neural transformer model with a supervised training dataset, the supervised training dataset containing translation tasks, a translation task containing a source code with a bug, a bug type annotation of the bug, and a bug fix for the bug. In an aspect, the one or more programs include further instructions that: generate a bug edit representation for each bug within the supervised training dataset; and compute a bug edit centroid for each bug type based on bug edit representations of each bug type, to be used during inference in place of the edit representation.

In an aspect, the neural transformer model includes one or more encoder blocks and one or more decoder blocks. In an aspect, the one or more programs include further instructions that: utilize the bug-fixing edit representation in at least one or more decoder blocks during training stage, and utilize bug edit centroid in at least one or more decoder blocks during inference stage, the bug edit centroid of a same bug type as the annotated bug type.

A method is disclosed comprising: pre-training a neural transformer model with an unsupervised training dataset, the unsupervised training dataset including a plurality of sequences of source code; fine-tuning the neural transformer model with a supervised training dataset, the supervised training dataset based a triplet including a code snippet with a bug, a code repair for the bug, and an annotated bug type; and applying the neural transformer model to generate a first code repair for a first code snippet having an identified bug and an identified bug type.

In one aspect, the method further comprises: applying a span masking function to each sequence of source code to mask out a subset of subtokens in a sequence; and wherein the neural transformer model learns original subtokens of the sequence. In an aspect, the fine-tuning the neural transformer model with a supervised training dataset further comprises: generating a bug edit embedding representing edits made to correct a bug; and computing a bug type centroid for each bug type from the bug edit embeddings of a particular bug type. In an aspect, the neural transformer model with attention includes one or more encoder blocks coupled to one or more decoder blocks.

In an aspect, fine-tuning the neural transformer model with supervised training dataset further comprises: concatenating the bug-fixing edit embedding with output from a last encoder block to input to a first decoder block or to encoder-decoder attention block, and concatenating the bug-fixing edit embedding with output embedding at each temporal step. In an aspect, the method, further comprises identifying the annotated bug type through a static analysis of the code snippet. In an aspect, the neural transformer model includes one or more encoder blocks and one or more decoder blocks, wherein an encoder block contains a multi-head attention layer and a feed-forward neural network, wherein a decoder block contains a masked multi-head attention layer, an encoder-decoder multi-head attention layer, and a feed-forward neural network. In an aspect, the annotated bug type includes a null pointer dereference, a memory leak, an immutable cast, empty vector access, or thread safety violation.

A device is disclosed comprising at least one processor and a memory. The at least one processor is configured to train a neural transformer model with attention to learn to translate a source code snippet with a bug and bug type into a code snippet with a repair for the bug by transfer learning, wherein the transfer learning pre-trains the neural transformer model from a plurality of unsupervised training data, the plurality of unsupervised training data including code snippets from a plurality of source code programs, wherein the transfer learning fine-tunes the pre-trained neural transformer model using a plurality of translation tasks, a translation task including a code snippet with a bug, a code snippet with a repair for the bug, and a bug type for the bug; and utilize the neural transformer model to predict a code repair for a second code snippet having a bug and a bug type.

In one aspect, the at least one processor is further configured to: utilize a static code analyzer to identify the bug type of the second code snippet. In an aspect, the at least one processor is further configured to: generate a bug edit representation for each translation task; and compute a bug type centroid for each bug type based on each bug edit representation of a bug type. In an aspect, the neural transformer model includes one or more encoder blocks coupled to one or more decoder blocks, wherein output of a last encoder block is input into each of the decoder blocks. In an aspect, the at least one processor is further configured to: concatenate the output of the last encoder block with a bug type centroid of a bug type of a fine-tuning triplet to a first decoder block.

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A computer-implemented method, comprising:
  pre-training a neural transformer model with attention with an unsupervised training dataset, the unsupervised training dataset including a plurality of sequences of source code;
  fine-tuning the neural transformer model with attention with a supervised training dataset, the supervised train- ing dataset based a triplet including a code snippet with a bug, a code repair for the bug, and an annotated bug type;

obtaining a first code snippet having an identified bug type and a bug-type edit centroid associated with the identified bug type, wherein the bug-type edit centroid represents edits to fix the annotated bug type; and applying the neural transformer model with attention to generate a first code repair for the first code snippet given the first source code snippet, the identified bug type, and the bug-type edit centroid.

2. The method of claim 1, further comprising:
applying a span masking function to each sequence of source code to mask out a subset of subtokens in a sequence; and
wherein the neural transformer model with attention learns original subtokens of the sequence.

3. The method of claim 1, wherein fine-tuning the neural transformer model with attention with a supervised training dataset further comprises:
generating a bug edit embedding representing edits made to correct a bug; and
computing a bug-type edit centroid for each bug type from the bug edit embeddings of a particular bug type.

4. The method of claim 3, wherein the neural transformer model with attention includes one or more encoder blocks coupled to one or more decoder blocks.

5. The method of claim 4, wherein fine-tuning the neural transformer model with attention with supervised training dataset further comprises:
concatenating the bug edit embedding with output from a last encoder block to input to a first decoder block or to encoder-decoder attention block, and concatenating the bug edit embedding with output embedding at each temporal step.

6. The method of claim 1, further comprising:
identifying the annotated bug type through an interprocedural static analysis of the code snippet.

7. The method of claim 1, wherein the neural transformer model with attention includes one or more encoder blocks and one or more decoder blocks, wherein an encoder block contains a multi-head attention layer and a feed-forward neural network, wherein a decoder block contains a masked multi-head attention layer, an encoder-decoder multi-head attention layer, and a feed-forward neural network.

8. The method of claim 1, wherein the annotated bug type includes a null pointer dereference, a memory leak, an immutable cast, empty vector access, or thread safety violation.

9. A system comprising:
one or more processors; and
a memory that stores one or more programs that are configured to be executed by the one or more processors, the one or more programs including instructions to perform actions that:
obtain a code snippet with a source code bug;
identify an annotated bug type for the source code bug from an interprocedural static code analysis of the code snippet;
obtain a bug-type edit centroid of the annotated bug type, wherein the bug-type edit centroid represents edits to fix the annotated bug type;
predict a bug repair for the code snippet from a neural transformer model with attention given the code snippet, the annotated bug type, and the bug-type edit centroid; and
utilize the predicted bug repair to repair the code snippet.

10. The system of claim 9, wherein the annotated bug type includes a null dereference, an immutable cast, an empty vector access, a memory leak, or a thread-safety violation.

11. The system of claim 9, wherein the one or more programs include further instructions to perform actions that:
pre-train the neural transformer model with attention with an unsupervised training dataset, the unsupervised training dataset including source code snippets.

12. The system of claim 11, wherein the one or more programs include further instructions to perform actions that:
fine-tune the pre-trained neural transformer model with attention with a supervised training dataset, the supervised training dataset containing translation tasks, a translation task containing a source code with a bug, a bug type annotation of the bug, and a bug fix for the bug.

13. The system of claim 12, wherein the one or more programs include further instructions to perform actions that:
generate a bug edit representation for each bug within the supervised training dataset; and
compute a bug-type edit centroid for each bug type based on the bug edit representations of each bug type.

14. The system of claim 13, wherein the neural transformer model with attention includes one or more encoder blocks and one or more decoder blocks.

15. The system of claim 14, wherein the one or more programs include further instructions to perform actions that:
utilize the bug edit representations in the one or more decoder blocks during a training stage, and utilize bug-type edit centroid in the one or more decoder blocks during inference stage, the bug-type edit centroid of a same bug type as the annotated bug type.

16. A device, comprising:
at least one processor and a memory;
wherein the at least one processor is configured to perform actions that:
train a neural transformer model with attention to learn to translate a source code snippet with a bug, bug type, and bug edit representation for the bug type into a code snippet with a repair for the bug by transfer learning,
wherein the transfer learning pre-trains the neural transformer model with attention from a plurality of unsupervised training data, the plurality of unsupervised training data including code snippets from a plurality of source code programs,
wherein the transfer learning fine-tunes the pre-trained neural transformer model with attention using a plurality of translation tasks, a translation task including a triplet having a code snippet with a bug, a code snippet with a repair for the bug, and a bug type for the bug; and
utilize the neural transformer model with attention to predict a code repair for a second code snippet having a bug, a bug type, and a bug-type edit centroid of the bug type, wherein the bug-type edit centroid represents edits of the annotated bug type.

17. The device of claim 16, wherein the at least one processor is further configured to perform actions that:
utilize a static code analyzer to identify the bug type of the second code snippet.

18. The device of claim 16, wherein the at least one processor is further configured to perform actions that:

generate a bug edit representation for each translation task; and compute the bug-type edit centroid for each bug type based on each bug edit representation of a bug type.

19. The device of claim 18, wherein the neural transformer model with attention includes one or more encoder blocks coupled to one or more decoder blocks, wherein output of a last encoder block is input into each of the decoder blocks.

20. The device of claim 19, wherein the at least one processor is further configured to perform actions that:

concatenate the output of the last encoder block with a bug type centroid of a bug type of a fine-tuning triplet to a first decoder block.

* * * * *